US009708776B2

(12) United States Patent
Constantine et al.

(10) Patent No.: US 9,708,776 B2
(45) Date of Patent: Jul. 18, 2017

(54) TRACK-MOUNTING ASSEMBLY

(71) Applicant: Amsted Rail Company Inc., Chicago, IL (US)

(72) Inventors: Edward Constantine, Kansas City, MO (US); Wilbur Osler, Mattituck, NY (US)

(73) Assignee: AMSTED RAIL COMPANY INC., Chicago, IL (US)

( * ) Notice: Subject to any disclaimer, the term of this patent is extended or adjusted under 35 U.S.C. 154(b) by 169 days.

(21) Appl. No.: 14/682,219

(22) Filed: Apr. 9, 2015

(65) Prior Publication Data

US 2016/0298298 A1 Oct. 13, 2016

(51) Int. Cl.
*E01B 9/42* (2006.01)
*E01B 9/48* (2006.01)
*E01B 9/62* (2006.01)

(52) U.S. Cl.
CPC ............... *E01B 9/42* (2013.01); *E01B 9/483* (2013.01); *E01B 9/62* (2013.01)

(58) Field of Classification Search
CPC ..... E01B 9/00; E01B 9/02; E01B 9/38; E01B 9/40; E01B 9/42; E01B 9/44; E01B 9/46; E01B 9/48; E01B 9/54; E01B 9/62; E01B 9/68

See application file for complete search history.

(56) References Cited

U.S. PATENT DOCUMENTS

| 1,781,251 | A | 11/1930 | Schwendt |
| 4,632,308 | A | 12/1986 | Fischer |
| 8,210,444 | B2 | 7/2012 | Osler |
| 8,413,910 | B2 * | 4/2013 | Bosterling ............... E01B 9/42 238/264 |
| 2011/0068184 | A1 | 3/2011 | Rademacher |

FOREIGN PATENT DOCUMENTS

EP 2363529 A 9/2011

* cited by examiner

*Primary Examiner* — R. J. McCarry, Jr.
(74) *Attorney, Agent, or Firm* — Andrew Wilford

(57) ABSTRACT

An assembly for mounting a longitudinally extending track on a substrate has a track plate having a top face adapted to carry the track and formed unitarily below the top face with a plurality of longitudinally extending tongues, a base plate at least partially below the track plate, adapted to be anchored to the substrate, horizontally surrounding the tongues of the track plate, and formed with a plurality of longitudinally extending tongues transversely spaced from, longitudinally interleaved with, and horizontally at least partially level with the tongues of the track plate. The track plate and base plate are wholly out of direct engagement with and spaced vertically and/or horizontally from each other. An elastic jacket or liner is engaged between the plates and between the tongues of the track plate and the tongues of the base plate.

10 Claims, 8 Drawing Sheets

TRACK-MOUNTING ASSEMBLY

FIELD OF THE INVENTION

The present invention relates to a track-mounting assembly. More particularly this invention concerns a track-mounting assembly.

BACKGROUND OF THE INVENTION

It is standard to mount a railroad track to a substrate by means of a metallic mounting assembly that holds the track down while permitting at least limited movement transverse of the longitudinal extending of the track. Such assemblies must be exceptionally rugged and have very long service lives, while still being subject to mass production at a reasonable unit cost since they are used in vast numbers.

The amount of give of such an assembly can be controlled by making it of two members or plates and providing an elastomeric cushion or lining between them. The track is directly secured to the track plate, the base plate is directly secured to the substrate, and the lining permits some relative movement of the two plates. While this works fairly well, it is difficult to adjust the resistance to displacement of the rail longitudinally, vertically, and transversely. In particular it is frequently necessary to provide completely different degrees of resistance transversely and longitudinally, as the transverse and longitudinal loads the track fastener is subjected to vary significantly.

OBJECTS OF THE INVENTION

It is therefore an object of the present invention to provide an improved track-mounting assembly.

Another object is the provision of such an improved track-mounting assembly that overcomes the above-given disadvantages, in particular that can be set up to offer widely different resistances to relative displacement of the two plates of the assembly in the vertical, transverse and longitudinal directions.

SUMMARY OF THE INVENTION

An assembly for mounting a longitudinally extending track on a substrate has according to the invention a track plate having a top face adapted to carry the track and formed unitarily below the top face with a plurality of longitudinally extending tongues, a base plate at least partially below, that is at a lower level than, the track plate, adapted to be anchored to the substrate, horizontally surrounding the tongues of the track plate, and formed with a plurality of longitudinally extending tongues transversely spaced from, longitudinally interleaved with, and horizontally at least partially level with the tongues of the track plate, which is to say at least parts of the tongues are below the top of the base plate. The track plate and base plate are wholly out of direct engagement with and spaced vertically and/or horizontally from each other. An elastic jacket engaged between the plates and between the tongues of the track plate and the tongues of the base plate has a lower face that, in an unstressed condition of the jacket, is at least partially spaced above the substrate. Thus downward movement of the track plate relative to the base plate and substrate stresses the jacket in shear between the fingers and, after a predetermined short downward movement, typically about 5 mm, when the jacket bottoms out on the substrate, compresses the jacket between the track plate and the substrate. The result is an initial relatively soft resistance to vertical deflection and a subsequent much stiffer resistance.

With this arrangement it is also possible to make the transverse resistance completely different from the longitudinal resistance by a factor determined largely by the number and size of the interleaved tongues. This variation is dependent on the hardness or durometer of the jacket, as well as the transverse and longitudinal spacing of the tongues and the height of the vertical overlap of the tongues.

The base plate according to the invention is provided is with formations for anchoring the base plate to the substrate and is formed according to the invention as a frame at least partially surrounding at least a lower portion of the track plate.

In accordance with the invention each of the tongues extends up to a full vertical height of the base plate. The tongues of the track plate extend horizontally and longitudinally outward from side edges of the track plate and the tongues of the base plate extend horizontally and longitudinally inward from an edge of a central hole of the base plate. Alternately, the tongues of the track plate extend downward therefrom and the tongues of the base plate extend upward therefrom.

The base plate according to the invention has end walls with transversely confronting faces transversely flanking the track plate and the track plate has ends with transversely directed end faces spacedly confronting the faces of the end walls of the base plate. The elastic jacket/liner fills between each of the faces of the end walls and the respective end face of the track plate. In addition the jacket extends over and covers outer surfaces of the top and base plate. This offers significant additional containment of stray electrical current and protection from the elements and greatly improves the appearance of the assembly while not increasing production costs significantly.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
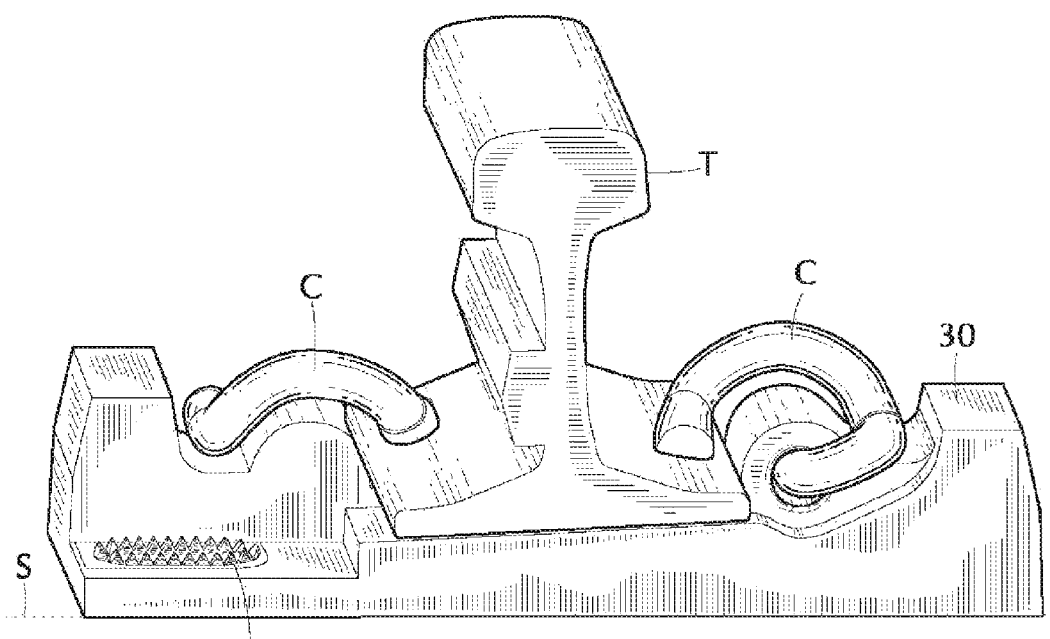
FIG. 1 is a perspective view from above of the track-mounting assembly of this invention with a section of track and its holddown clips.
Figure 2:
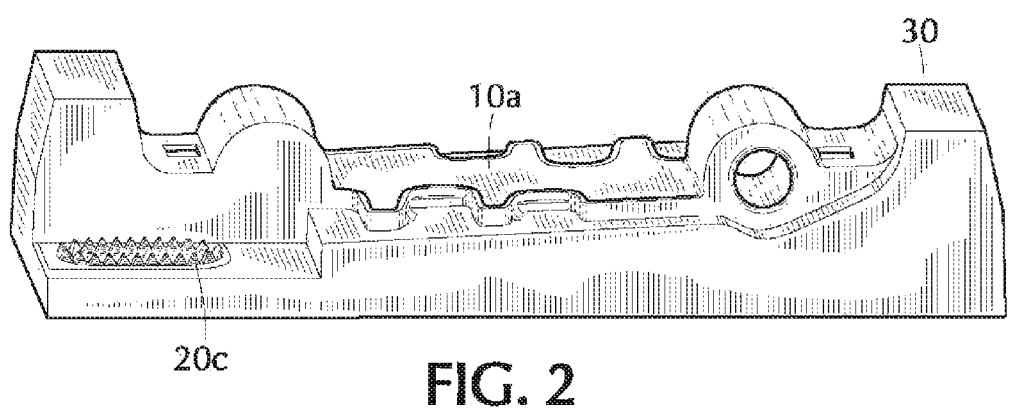
FIG. 2 is a view like FIG. 1, but only of the track plate, frame, and elastic jacket of the invention, the track and holddown clips not shown.
Figure 3:
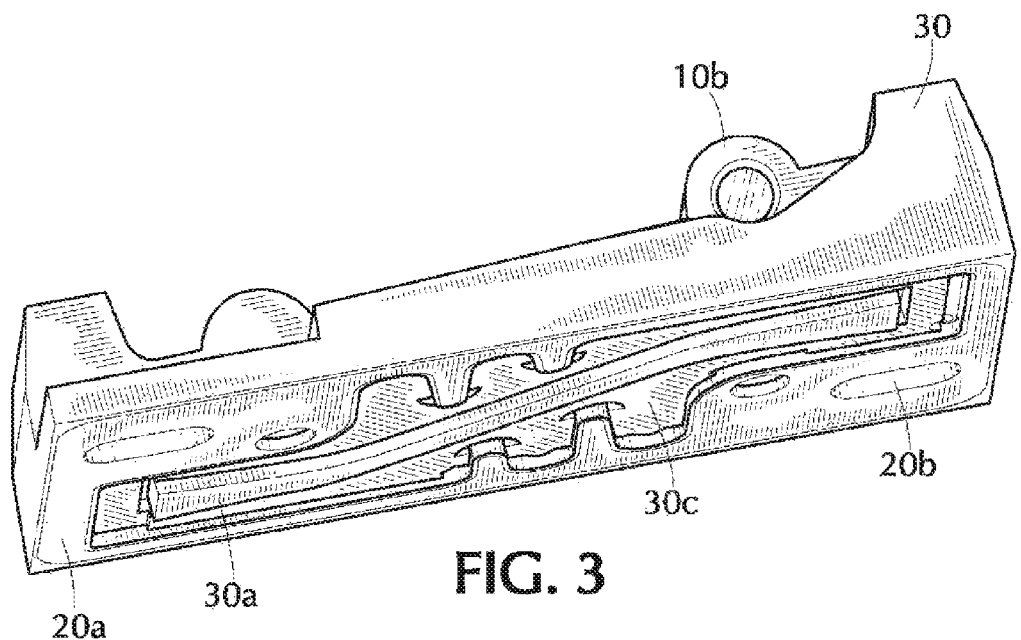
FIG. 3 is a perspective view from below of the elements shown in FIG. 2.
Figure 4:
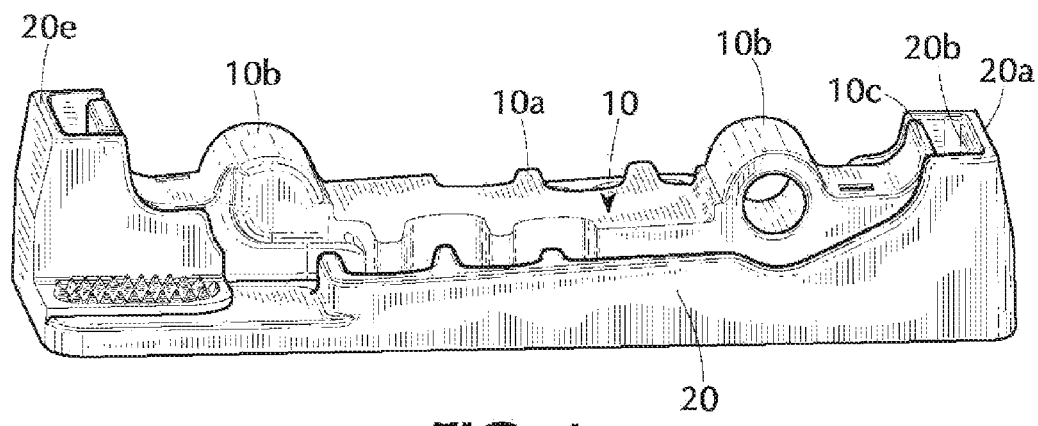
FIG. 4 is a view like FIG. 2, but only of the track plate and frame, with the elastic jacket not shown.
Figure 5:
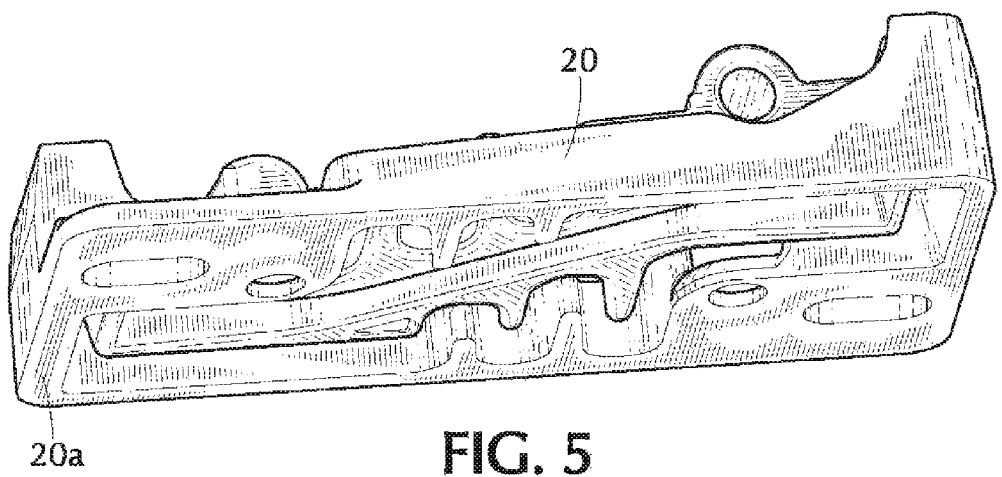
FIG. 5 is a perspective view from below like FIG. 3, but only showing the track plate and frame like FIG. 4.
Figure 6:
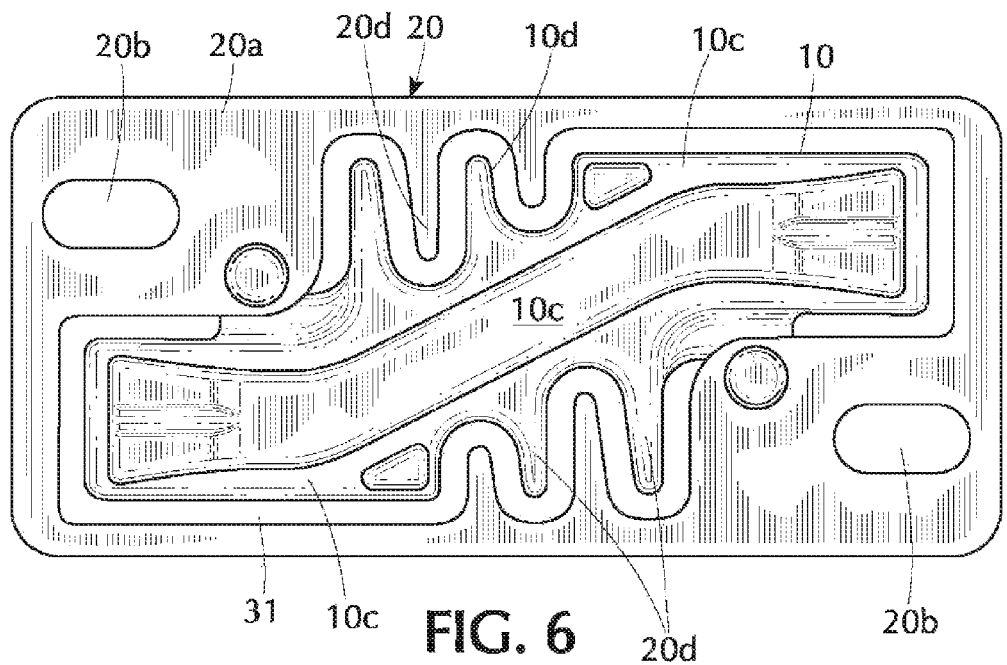
FIGS. 6 and 7 are bottom and top views of the track plate and frame as shown in FIGS. 3 and 4.
Figure 7:
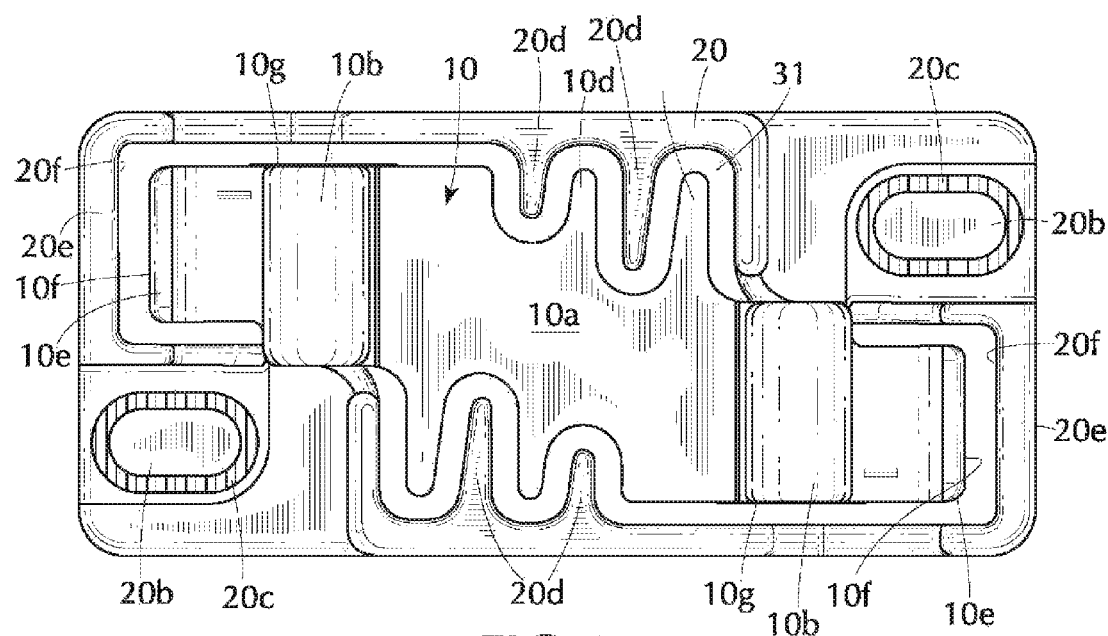
Figure 8:
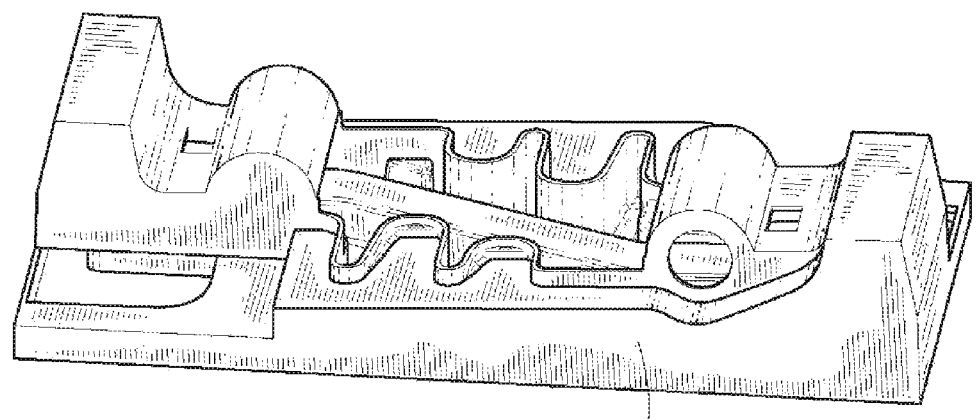
FIGS. 8 and 9 are perspective views from above and below of only the elastic jacket of the embodiment shown in FIGS. 1-7.
Figure 9:
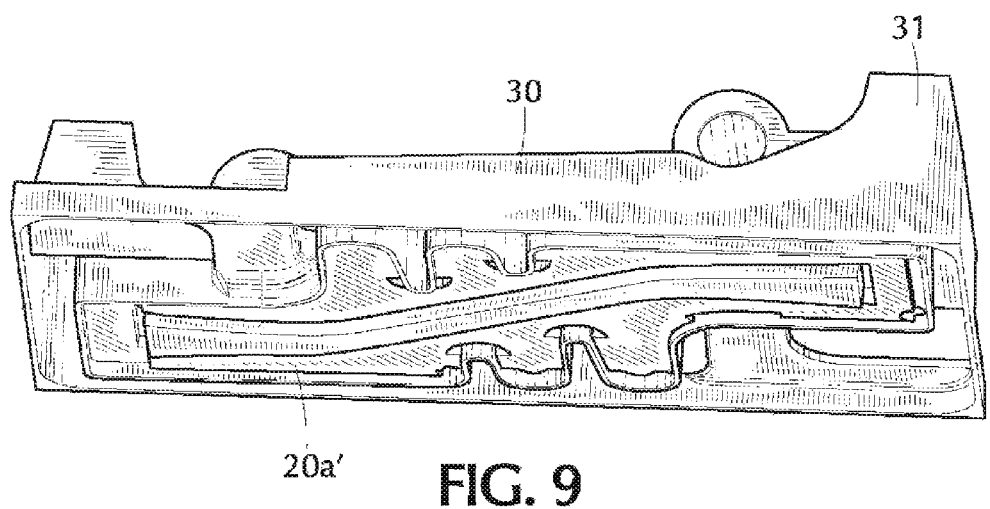

As seen in FIG. 1 a railroad track T extends longitudinally horizontally in a direction generally perpendicular to the plane of view. It is held down on a track mounting assembly described in further detail below by a pair of E-clips C of standard construction. In the following the term "longitudinal" refers to the horizontal extension of the track T and "transverse" to a horizontal direction perpendicular to the longitudinal direction and generally parallel to the plane of view.

As shown in more detail in FIGS. 2-7 the track-mounting assembly basically has three parts: a track plate 10, a base plate or frame 20, and a molded elastic jacket 30 that covers and extends between the plates 10 and 20 but leaves areas described in more detail below exposed. The jacket 30 also acts as an electrically insulating liner between the plates 10 and 20 and as a buffer or spring to allow limited relative movement of the plates 10 and 20. The plates 10 and 20 are both made of ductile iron.

The track plate 10 has a central planar upper face 10a on which the track T sits in direct metal-to-metal contact, and a pair of transversely spaced, longitudinally staggered, and longitudinally oppositely open eyes 10b each holding the outer leg of a respective one of the E-clips C, as is standard. Most of the upper surfaces of the track plate 10 and principally not the face 10a and the interior of the eyes 10b are normally covered by or filled with the jacket 30.

The base plate 20 is normally formed as a rectangular frame surrounding a lower portion (described in more detail below) of the upper track plate 10 and has a planar bottom face 20a adapted to sit flatly on a fixed substrate S such as a sleeper or slab. This bottom face 20a and toothed rings 20c formed on the base plate 20 are also not covered by the jacket 30, although it may be supported on a thin plastic sheet on the normally rigid substrate S. It is formed in transversely spaced and diagonally opposite corners with throughgoing slots 20b surrounded by the toothed gage adjustment rings 20c such as described in commonly owned and pending patent application Ser. No. 13/757,398 filed 1 Feb. 2013, which is herewith incorporated by reference. These toothed rings 20c are not covered by the jacket 30. According to the invention substantially all of the upper surfaces except the rings 20c and the face 10a, and all of the vertical side surfaces are normally also covered by the elastic jacket 30 that also extends between the plates 10 and 20.

At least a lower part 10c of the track plate 10 is wholly horizontally surrounded by the frame plate 20 and is formed on each longitudinally directed and transversely extending side with at least two generally triangular tongues 10d projecting longitudinally oppositely outward. Complementarily, the frame plate 20 is formed with similarly shaped inwardly projecting tongues 20d that are spacedly interleaved with the tongues 10d. Horizontally directed outer surfaces of the lower part 10c and its tongues 10d are spaced inward from and are complementary to horizontally inwardly directed inner surfaces of a central hole of the base plate 20, defining therewith a gap 31 of uniform horizontal width that is filled by the elastomeric jacket/liner 30.

In addition according to the invention the transverse ends of the base plate 20 are unitarily formed with upstanding end walls 20e having inner faces 20f that are vertical, and the transverse ends of the track plate 10 similarly have longitudinally extending and upwardly projecting ridges 10e with outwardly directed vertical faces 10f confronting the faces 20f. The jacket 30 also fills the space between the faces 10f and 20f that are basically planar and extend longitudinally parallel to each other.

The track plate 10 does not at any point directly contact the base plate 20. All of the vertical surfaces between the plates 10 and 20 are at substantially the same spacing both transversely and longitudinally, and in fact the track plate 10 is actually of substantially the same external shape at least in its lower part 10c (although this is not critical to the invention) as the inner surfaces of the central hole of the base plate 20 except at the eyes 10b, but somewhat smaller to define the uniform gap 31 filled by the body 30. Thus the track plate 10 is horizontally captured in the base plate 20 and is electrically insulated therefrom, but is movable relative thereto horizontally both transversely and longitudinally, depending on the design of vertical stiffness of the track-mounting assembly. Relative vertical displacement of the plates 10 and 20 is normally limited to about 5 mm and relative horizontal displacement is significantly less.

Figure 10:
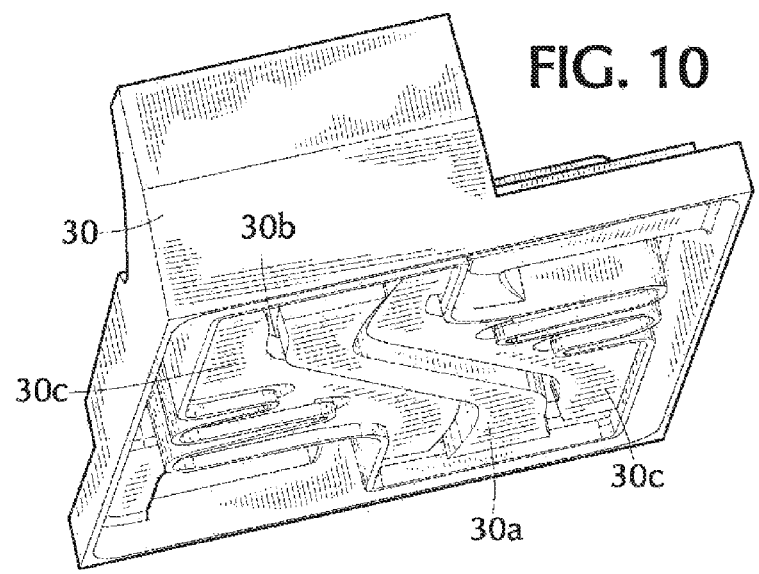
FIG. 10 is perspective view from below of the elastic jacket shown in FIGS. 8 and 9.
Figure 11:
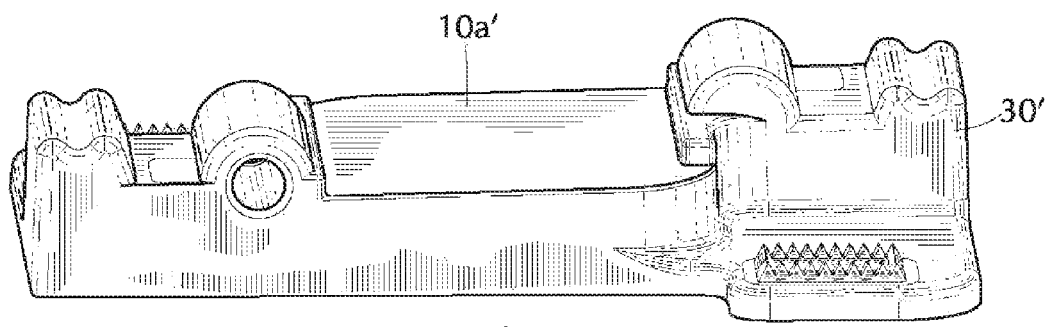
FIGS. 11 and 12 are perspective views from above and below of a second embodiment of the invention.

With respect to relative vertical movement of the plates 10 and 20, it is first noted that the upper face 10a of the track plate 10 on which the track T sits is above the parts of the frame plate 20 aligned longitudinally with it so that the track T normally never touches the base plate 20. What is more, the jacket 30 as shown in FIG. 10 is formed on its side opposite the face 30c with a unitary central bar 30a surrounded by a downwardly open groove or trench 30b, and this bar 30a has a lower face that is coplanar with a plane of the lower face 20a of the frame 20 but spaced above it by about 5 mm. This surface 30c engages the substrate S after about 5 mm displacement to dramatically inhibit further deflection.

Thus when a train passes, the track T is pressed downward and the track plate 10 is similarly pressed downward. For the first part of the short travel of the track plate 10, only the relative small compressive resistance of the small bar 30a and shear between vertical surfaces of the track and frame plates 10 and 20 impede downward vertical movement of the track plate relative to the frame plate 20 sitting on the immovable substrate.

The resistance to transverse and longitudinal movement is similarly different but is due to the fact that the fingers 10d and 20d extend longitudinally parallel to the track T. Transverse shifting is, as is clear from FIGS. 6 and 7, accompanied by compression of six layers and stretching of six layers of the elastic jacket 30 whereas longitudinal shifting is accompanied by compression of one layer and stretching of one layer, plus significant shear in a number of layers. Of course, fewer or more than six layers is possible within the scope of the invention. In use, however, the forces applied longitudinally on the track plate 10 are generally smaller than those effective transversely.

The elastic jacket/liner 30 serves several functions:

1. It provides different responses to transverse and longitudinal forces applied to the track plate 10 while permitting limited transverse and longitudinal movement of the track plate 10 relative to the base plate 20.

2. It provides different responses to vertical movement of the track plate 10, with modest resistance to downward deflection for a first short distance of about 5 mm and then significantly greater resistance to further travel.

3. It electrically isolates the track plate 10 from the base plate 20 and from the substrate S, as the jacket 30 is a dielectric.

4. It covers and protects most of the outer surfaces of both of the plates 10 and 20, but not the underside of the frame and other locations where metal-to-metal contact is needed.

The embodiment shown in FIGS. 11-18 functions similarly to that of FIGS. 1-10 and is made of substantially the same materials. Accordingly the same reference numerals are used, with primes (') for functionally identical parts.

Here a track plate 10' has a track-support face 10a' and eyes 10b' and sits atop a base plate 20' having a planar bottom face 20a' and mounting holes 20b', with a one-piece elastic molded jacket/liner 30' between and covering the plates 10' and 20'.

The track plate 10' has two longitudinally spaced rows each of six longitudinally extending triangular-section ridges or tongues 10d' that project downward and the base plate 20' has two longitudinally spaced rows of four complementary longitudinally extending triangular-section ridges or tongues 20d' that project upward between the tongues 10d'. Again the horizontal spacing between the tongues 10d' and 20d' and horizontal confronting surfaces of the plates 10' and 20' are substantially the same and filled with the jacket/liner 30', as are spaces between end faces 10f' and 20f'. The base plate 20' is formed with holes 20g' aligned with the tongues 10d' of the track plate 10', which holes 20g' are filled above the bottom face 20a' with the jacket 30'. The track plate 10' is formed above the tongues 20d' of the base plate 20' with pockets in which the respective tongues 20d' are received with spacing filled by the jacket/liner 30'.

Figure 12:
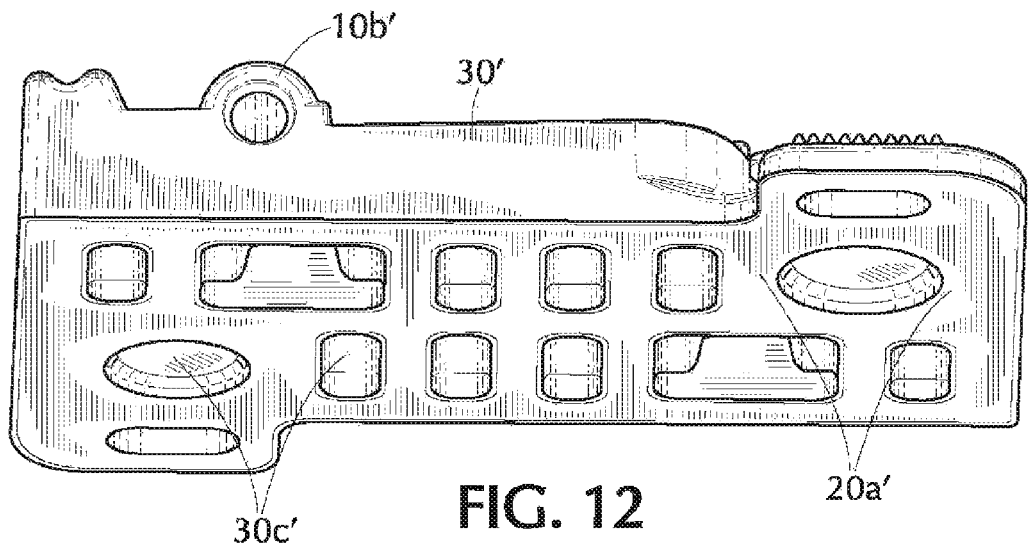
Figure 13:
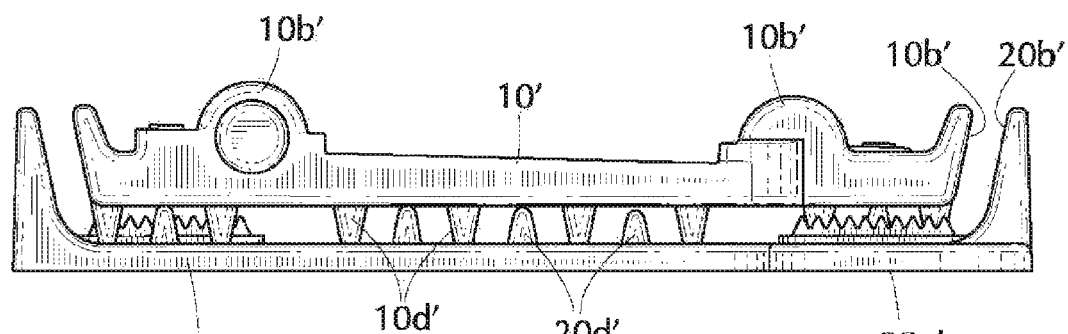
FIG. 13 is a side view of the track plate and base plate as shown in FIGS. 10 and 11, with the elastic jacket not shown.
Figure 14:
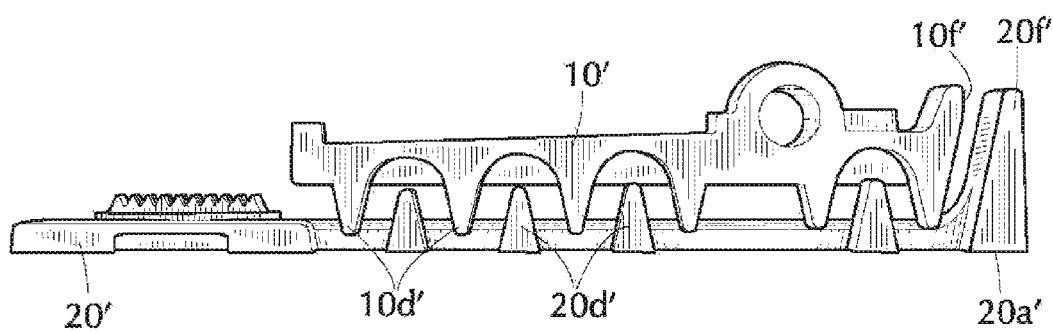
FIG. 14 is a longitudinally sectional side view of the second embodiment, with the elastic jacket not shown.
Figure 15:
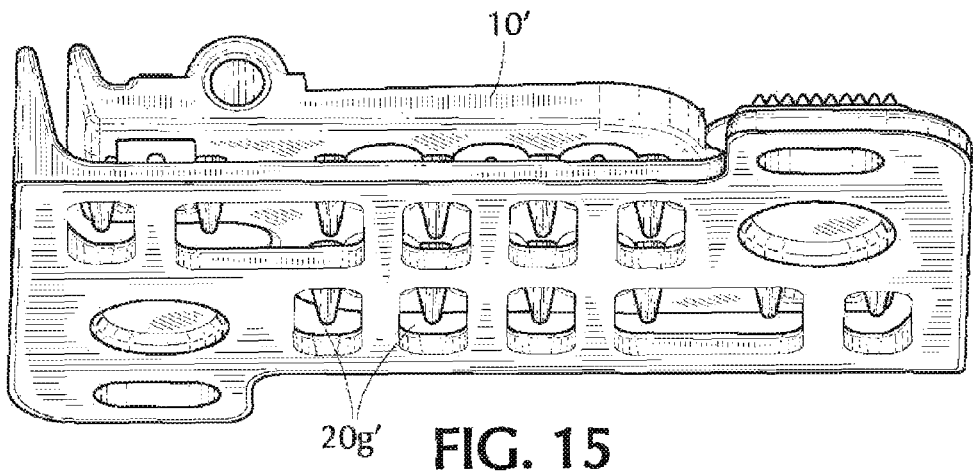
FIG. 15 is a perspective view from below like FIG. 11, with the elastic jacket not shown.
Figure 16:
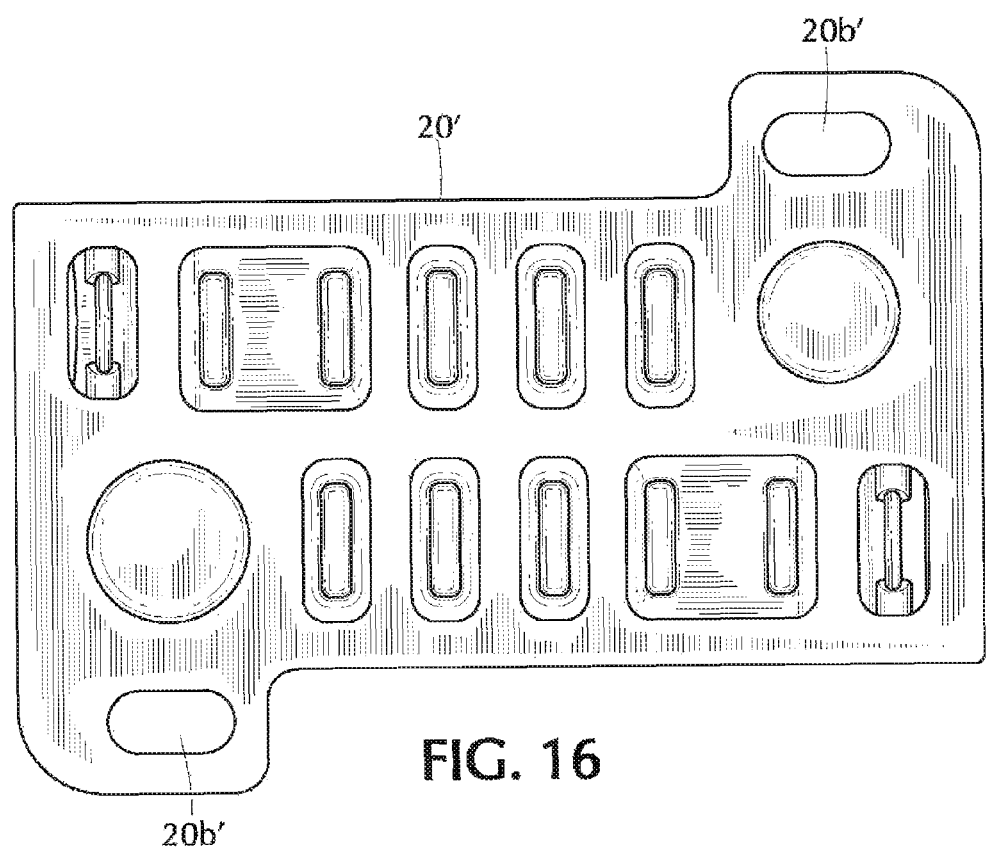
FIG. 16 is a bottom view of the second embodiment with the elastic jacket not shown.
Figure 17:
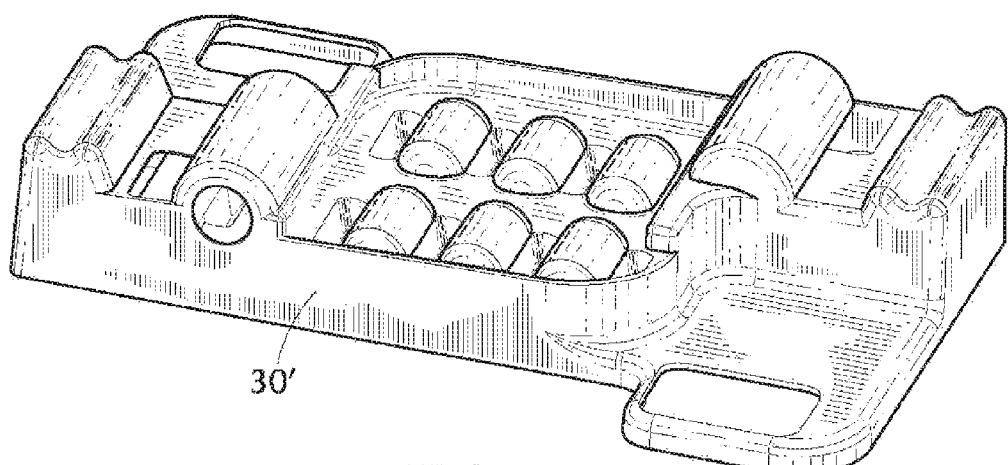
FIGS. 17 and 18 are perspective views from above and below of only the elastic jacket of the second embodiment.
Figure 18:
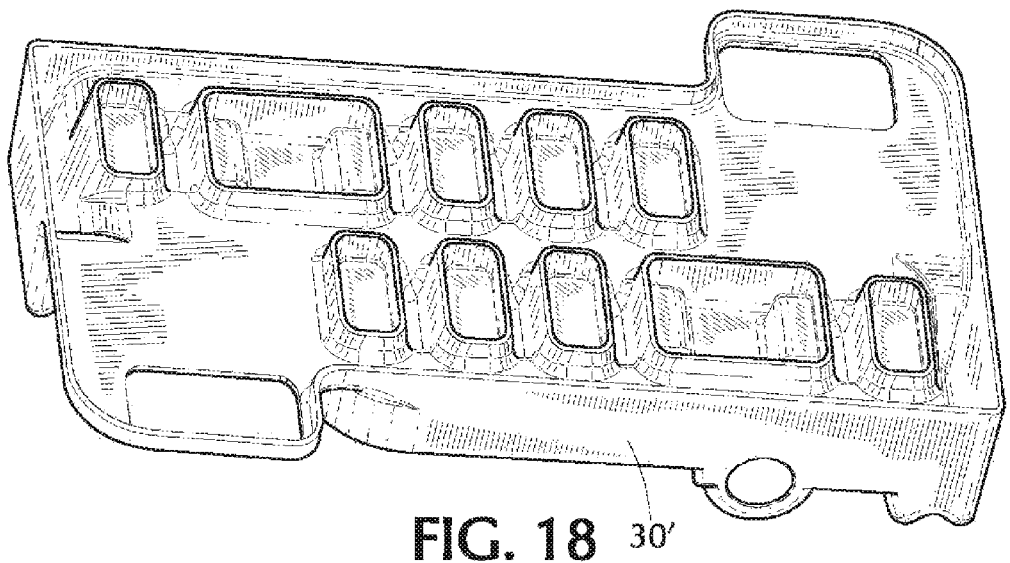

The jacket 30' as shown in FIG. 12 is hollowed out or formed with downwardly open pockets or cavities 30c' at least about 6 mm deep that allow rubber to bulge and permit normal displacement of the track plate 10. Downward deflection sufficient to bulge rubber out to partially fill the cavities 30c' occurs during downward displacement of the track plate 10. Deflection is typically limited to a range of 2 mm to 3 mm.

This embodiment functions like that of FIGS. 1-10, presenting different resistance to displacement of the track plate 10' relative to the base plate 20' in the vertical, longitudinal, and transverse directions, with the jacket 30' carrying the track plate 10' on the base plate 20' and insulating it therefrom.

We claim:

1. An assembly for mounting a longitudinally extending track on a substrate, the assembly comprising:
    a track plate having a top face adapted to carry the track and formed unitarily below the top face with a plurality of downwardly projecting tongues extending longitudinally parallel to the track;
    a base plate adapted to be anchored to the substrate, horizontally surrounding the tongues of the track plate, and formed with a plurality of upwardly projecting tongues extending longitudinally parallel to the track and transversely spaced from and horizontally interleaved with the tongues of the track plate, the track plate and base plate being wholly out of direct engagement with and spaced vertically or horizontally from each other; and
    an elastic jacket engaged between the plates and between the tongues of the track plate and the tongues of the base plate, whereby downward movement of the track plate relative to the substrate stresses the jacket in shear between the fingers.

2. The mounting assembly defined in claim 1, wherein the base plate is provided with formations for anchoring the base plate to the substrate.

3. The mounting assembly defined in claim 1, wherein the base plate is formed as a frame at least partially surrounding at least a lower portion of the track plate.

4. The mounting assembly defined in claim 3, wherein each of the tongues of at least the base plates extend up to a full vertical height thereof.

5. The mounting assembly defined in claim 4, wherein the tongues of the track plate extend horizontally and longitudinally outward from side edges of the track plate and the tongues of the base plate extend horizontally and longitudinally inward from an edge of a central hole of the base plate.

6. The mounting assembly defined in claim 1, wherein the tongues of the track plate extend downward therefrom and the tongues of the base plate extend upward therefrom.

7. The mounting assembly defined in claim 1, wherein the base plate has end walls with transversely confronting faces transversely flanking the track plate and the track plate has ends with transversely directed end faces spacedly confronting the faces of the end walls of the base plate, the elastic jacket filling between each of the faces of the end walls and the respective end face of the track plate.

8. The mounting assembly defined in claim 1, wherein the jacket extends over and covers outer surfaces of the top and base plate.

9. The mounting assembly defined in claim 1, wherein the jacket has a downwardly directed lower surface that is spaced above the substrate such that, on downward displacement of the top plate, the elastomer forming the jacket moves downward without deformation until engaging the substrate, after which the jacket is compressed elastically to limit further downward displacement of the track plate.

10. The mounting assembly defined in claim 9, wherein the jacket forms a downwardly projecting and longitudinally elongated bar bearing at most lightly in an uncompressed condition of the mounting assembly on the substrate and is compressed as the track plate moves downward relative to the base plate when subjected to load.

* * * * *